US010599850B1

(12) United States Patent
Loihl et al.

(10) Patent No.: US 10,599,850 B1
(45) Date of Patent: Mar. 24, 2020

(54) DISTRIBUTED SECURITY AGENT TECHNOLOGY

(71) Applicant: Tripwire, Inc., Portland, OR (US)

(72) Inventors: Robert Loihl, Portland, OR (US); Robert Huffman, Portland, OR (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 13/907,600

(22) Filed: May 31, 2013

Related U.S. Application Data

(60) Provisional application No. 61/800,644, filed on Mar. 15, 2013.

(51) Int. Cl.
 *G06F 21/57* (2013.01)

(52) U.S. Cl.
 CPC .......... *G06F 21/577* (2013.01); *G06F 21/57* (2013.01)

(58) Field of Classification Search
 CPC .............................. G06F 21/577; G06F 21/57
 USPC ....................................................... 726/25, 1
 See application file for complete search history.

(56) References Cited

U.S. PATENT DOCUMENTS

| | | | |
|---|---|---|---|
| 7,243,348 B2 | 7/2007 | Good et al. | |
| 7,316,016 B2 | 1/2008 | DiFalco | |
| 7,360,099 B2 | 4/2008 | DiFalco et al. | |
| 7,587,754 B2 | 9/2009 | DiFalco et al. | |
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 8,140,635 B2 | 3/2012 | DiFalco | |
| 8,176,158 B2 | 5/2012 | DiFalco et al. | |
| 2004/0024843 A1 | 2/2004 | Smith | |
| 2004/0122962 A1 | 6/2004 | DiFalco et al. | |
| 2006/0206883 A1 | 9/2006 | Sabbouh | |
| 2006/0242277 A1 | 10/2006 | Torrence et al. | |
| 2007/0043786 A1 | 2/2007 | DiFalco et al. | |
| 2007/0124255 A1 | 5/2007 | DiFalco et al. | |
| 2007/0192867 A1* | 8/2007 | Miliefsky | H04L 63/20 726/25 |
| 2007/0239862 A1 | 10/2007 | Bronez et al. | |

(Continued)

OTHER PUBLICATIONS

"OVAL Definition Tutorial", pp. 1-44, 2007, published by the MITRE Corporation.*

(Continued)

*Primary Examiner* — Theodore C Parsons
*Assistant Examiner* — Thomas Ho
(74) *Attorney, Agent, or Firm* — Klarquist Sparkman, LLP

(57) ABSTRACT

Apparatus and methods are disclosed for identifying differences in objects of a computing device using definitions expressed in vulnerability assessment languages such as Open Vulnerability and Assessment Language (OVAL). In one example of the disclosed technology, a method includes receiving criteria for evaluating the computing device using an agent. The criteria specify object tests used to generate associated state values based on states or status of the tested objects. The criteria are evaluated and first state values generated by performing the object tests are stored as expected values for object tests. The criteria are then evaluated by re-performing the object tests, and second state values thereby generated are compared to the first state values. One or more differences between the first and second state values can be identified and reported to, for example, a monitor server.

26 Claims, 5 Drawing Sheets

(56) References Cited

U.S. PATENT DOCUMENTS

| | | |
|---|---|---|
| 2008/0016501 A1 | 1/2008 | Muhlestein et al. |
| 2008/0021912 A1 | 1/2008 | Seligman et al. |
| 2008/0168420 A1 | 7/2008 | Sabbouh |
| 2010/0005107 A1 | 1/2010 | DiFalco |
| 2010/0043066 A1 | 2/2010 | Miliefsky |
| 2011/0066951 A1 | 3/2011 | Ward-Karet et al. |
| 2011/0126288 A1* | 5/2011 | Schloegel ............ G06F 21/577 726/25 |
| 2011/0179477 A1* | 7/2011 | Starnes et al. .................... 726/9 |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0208841 A1 | 8/2011 | Robertson et al. |
| 2012/0023076 A1 | 1/2012 | Torrence et al. |
| 2012/0179805 A1 | 7/2012 | DiFalco |
| 2012/0210434 A1 | 8/2012 | Curtis et al. |
| 2013/0219493 A1* | 8/2013 | Banzhof ............ H04L 63/1433 726/22 |

OTHER PUBLICATIONS

"Writing an OVAL definition", Version 5.3 pp. 1-7, 2006 MITRE Corporation.*

Lucideus Research "Open Vulnerability Assessment Language: An overview", Oct. 27, 2018.*

"How OVAL Works: Open Vulnerability and Assessment Language," downloaded from http://oval.mitre.org/about/images/how_oval_works.pdf, 1 page (document not dated, downloaded on Mar. 5, 2013).

"OVAL Language Overview," downloaded from http://ovel.mitre.org/language/about/overview.html, 3 pages (document not dated, downloaded on Mar. 5, 2013).

"OVAL Adoption: Use Cases Guide," downloaded from http://oval.mitre.org/adoption/usecasesguide.html, 11 pages (document not dated, downloaded on Mar. 5, 2013).

CyberTrust Technology Institute (CTTI), "Crystal Security Keeper (CSK)," downloaded from http://www.iii.org.tw/infor/2012/ctti/crystal/data/CSK%20Datashee%20cht.pdf, 5 pages (document not dated, downloaded on Mar. 5, 2013).

CyberTrust Technology Institute (CTTI), "Crystal Security Keeper (CSK) Requirements," downloaded from http://www.iii.org.tw/infor/2012/ctti/crystal/en/csk.html, 2 pages (document not dated, downloaded on Mar. 5, 2013).

CyberTrust Technology Institute (CTTI), "Crystal Security Keeper (CSK) Architecture," downloaded from http://www.iii.org.tw/infor/2012/ctti/crystal/en/csk.html, 2 pages (document not dated, downloaded on Mar. 5, 2013).

CyberTrust Technology Institute (CTTI), "Crystal Security Keeper (CSK) Functions," downloaded from http://www.iii.org.tw/infor/2012/ctti/crystal/en/csk.html, 2 pages (document not dated, downloaded on Mar. 5, 2013).

CyberTrust Technology Institute (CTTI), "Crystal Security Keeper (CSK) Result," downloaded from http://www.iii.org.tw/infor/2012/ctti/crystal/en/csk.html, 2 pages (document not dated, downloaded on Mar. 5, 2013).

CyberTrust Technology Institute (CTTI), "Crystal Security Keeper (CSK) Vulnerability," downloaded from http://www.iii.org.tw/infor/2012/ctti/crystal/en/csk.html, 2 pages (document not dated, downloaded on Mar. 5, 2013).

The MITRE Corporation, "An Introduction to the OVAL™ Language," Version 5.0, 14 pages (document marked 2006).

The MITRE Corporation, "Writing an OVAL Definition," Version 5.3, 7 pages (document marked 2006).

Waltermire et al., National Institute of Standards and Technology (NIST), "The Technical Specification for the Security Content Automation Protocol (SCAP): SCAP Version 1.2," 58 pages (Sep. 2011).

Quinn et al., National Institute of Standards and Technology (NIST), "Guide to Adopting and Using the Security Content Automation Protocol (SCAP) Version 1.0," 26 pages (Jul. 2010).

* cited by examiner

```
<definitions>
    <definition definition_id="oval:com.tripwire.oval:def:8891" version="1.5"
class="vulnerability">>
        <criteria>
            <criteria operator="OR">
                <criteria operator="AND">
                    <criterion test_ref="oval:com.tripwire.oval:tst:234"
                    comment="file /etc/password exists"/>
                    <criterion test_ref="oval:com.tripwire.oval:tst:1449" negate="true"
                    comment="file /etc/password not user-readable"/>
                </criteria>
                <criteria>
                    <criterion test_ref="oval:com.tripwire.oval:tst:123" comment="OS
                    patch 5763.3 installed"/>
                </criteria>
            </criteria>
        </criteria>
    </definition>
    <definition>...</definition>
    <definition>...</definition>
</definitions>

<tests>
    <file_test id="oval:org.mitre.oval:tst:234" version="1" check_existence=""
check="" comment="">
        <object object_ref="/etc/password">
        <state state_ref="oval:existenceenumeration" id=oval:org.mitre.oval:tst:255>
            <def:only_one_exists dataype=boolean>1</def:only_one_exists>
    </file_test>
    <file_test id="oval:org.mitre.oval:tst:1449" version="1" check_existence=""
check="" comment="">
        <object object_ref="/etc/password">
        <state state_ref="oval:file_state" id=oval:org.mitre.oval:tst:3000>
            <def:owrite datatype=boolean>0</def:owrite>
    </file_test>
</tests>
```

303 brackets the <criteria> block.
305 brackets the second <file_test> block.
307 points to the <def:owrite> line.

```
<definitions>
    <definition definition_id="oval:com.tripwire.oval:def:8891" version="1.5"
class="vulnerability">>
        <criteria>
            <criteria operator="OR">
                <criteria operator="AND">
                    <criterion test_ref="oval:com.tripwire.oval:tst:234"
                comment="file /etc/password exists"/>
                    <criterion test_ref="oval:com.tripwire.oval:tst:1449" negate="true"
                comment="file /etc/password not user-readable"/>
                </criteria>
                <criteria>
                    <criterion test_ref="oval:com.tripwire.oval:tst:123" comment="OS
                patch 5763.3 installed"/>
                </criteria>
            </criteria>
        </criteria>
    </definition>
    <definition>...</definition>
    <definition>...</definition>
</definitions>

<tests>
    <file_test id="oval:org.mitre.oval:tst:234" version="1" check_existence=""
check="" comment="">
        <object object_ref="/etc/password">
        <state state_ref="oval:existenceenumeration" id=oval:org.mitre.oval:tst:255>
            <def:only_one_exists datatype=boolean>1</def:only_one_exists>
    </file_test>
    <file_test id="oval:org.mitre.oval:tst:1449" version="1" check_existence=""
check="" comment="">
        <object object_ref="/etc/password">
        <state state_ref="oval:file_state" id=oval:org.mitre.oval:tst:3000>
            <def:owrite datatype=boolean>1</def:owrite>
    </file_test>
</tests>
```

315

317

DISTRIBUTED SECURITY AGENT TECHNOLOGY

CROSS-REFERENCE TO RELATED APPLICATION

This application claims the benefit of U.S. Provisional Application No. 61/800,644, entitled "Distributed Security Agent Technology," filed Mar. 15, 2013, which application is incorporated by reference herein in its entirety for all purposes.

FIELD

This application relates generally to the field of information technology ("IT") compliance, including utilizing distributed compliance and security agents.

BACKGROUND

Vulnerability assessment languages, such as OVAL (Open Vulnerability and Assessment Language), specifications of which are distributed by the MITRE Corporation, can be used to enhance interoperability by providing standardized definitions for tests that can be performed on computing devices to check, for example, registry entries, file integrity, filesystem permissions, and other system characteristics. Current OVAL definitions are authored by security authorities and can be used to evaluate whether a particular computing device complies with a published security policy described in OVAL definition files. However, because these definitions describe already-known security threats and policies, such methodologies are inflexible and are not adapted to evaluate unknown or dynamic vulnerability and compliance issues in the deployed environment.

SUMMARY

Apparatus and methods are disclosed below for using descriptions of policies to apply to computing device objects expressed in vulnerability assessment languages. For examples, descriptions of a policy can be described in an eXtensible Markup Language (XML) file and distributed to agents executing on computing devices that can evaluated the described policies. Definitions described in the policy include criteria, which are evaluated based on combining results of performing test(s) further defined in the policy. The tests describe an object associated with the computing device (e.g., a registry entry, hardware state, file state, file contents, or other objects associated with the device) and a state of the object to be tested for (e.g., expected (or unexpected) registry values, file states (e.g., file permissions, open or closed status, file sizes, or file modification dates), file contents (e.g., the existence or non-existence of strings, series of bytes, or other file contents), or other suitable states on the computing device that can be tested.

In addition to determining whether a computing device satisfies the criteria defined in a policy definition file, the state values themselves can be stored on the computing device for later comparison. By comparing two state values that are evaluating at different points in time, differences in the associated objects can be identified and reported. Thus, in situations where state values associated with an object change, but the state values are still in compliance with the specified policy definition, the state values can be flagged or reported and then subject to further evaluation.

Such reporting can help administrators improve policy definitions, for example, by identifying unusual or rare device states, and then defining improved policies based on examining the reported differences. Using the policy definitions in this way allows for dynamic security automation by applying published policy definitions.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures. Further, any trademarks used herein are the property of their respective owners.

BRIEF DESCRIPTION OF THE DRAWINGS

FIGS. 3A and 3B illustrate portions of OVAL-like code for definitions that can be used with some implementations of the disclosed methods.

DETAILED DESCRIPTION

I. General Considerations

Figure 1:
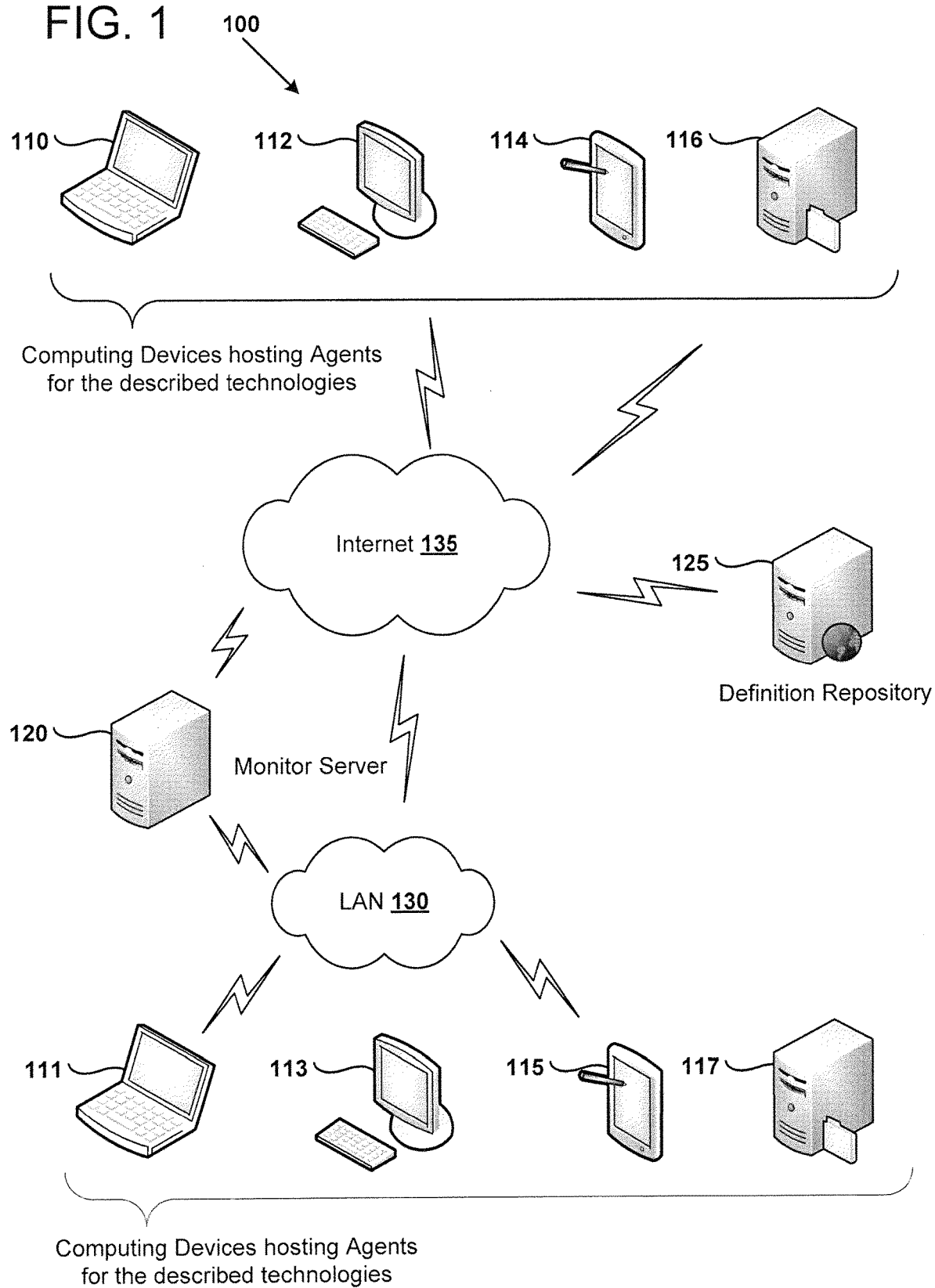
FIG. 1 illustrates an example of a possible network topology (e.g., a client-server network) for implementing a distributed security agent technology according to the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "test," "criteria," and "perform" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 4:
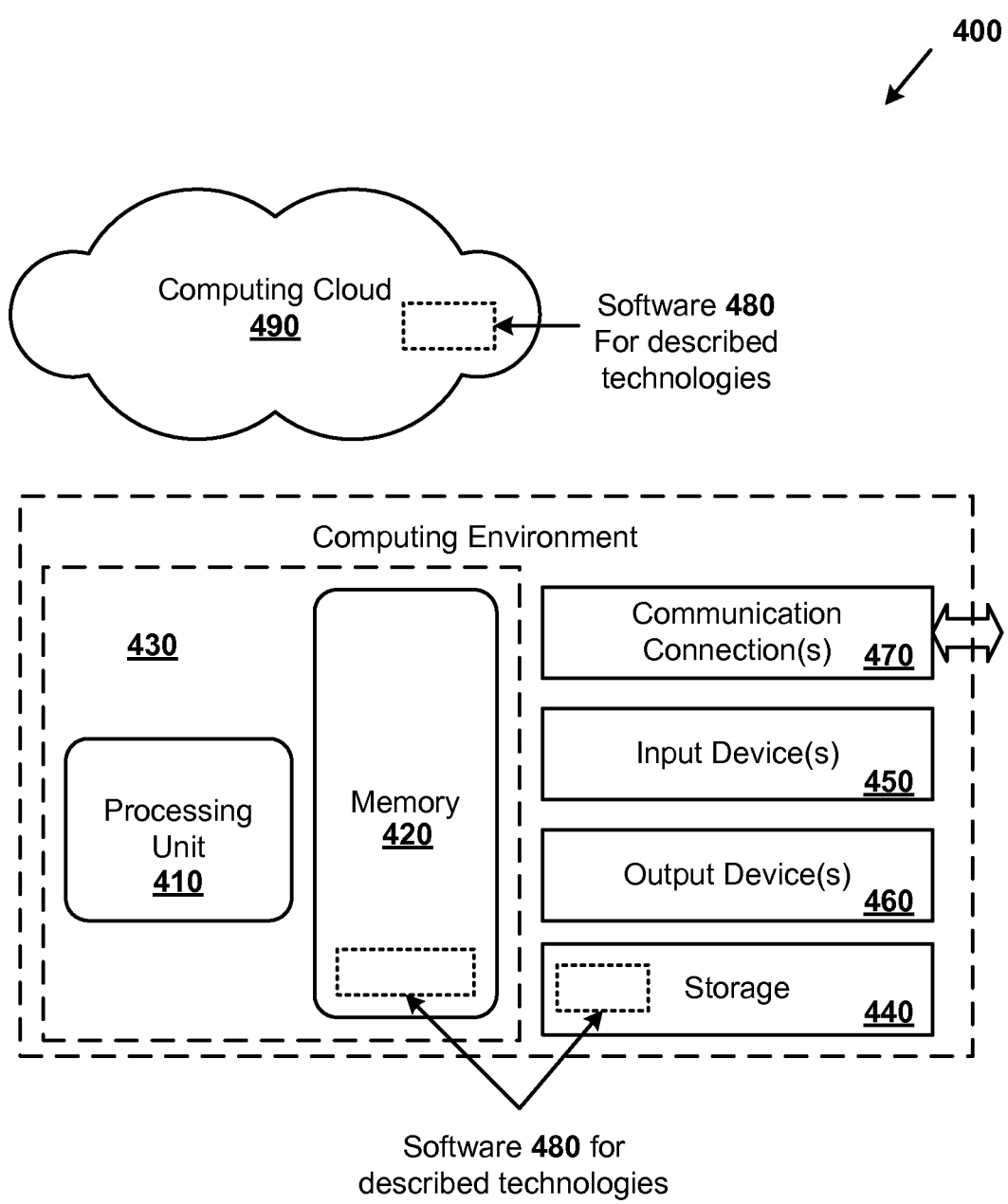
FIG. 4 illustrates a generalized example of a suitable computing environment in which described embodiments, techniques, and technologies, including reporting agents and monitor servers, can be implemented.

II. Example Networking Environment for Implementing Embodiments of the Disclosed Technology An example of a possible network topology (e.g., a client-server network) for implementing a distributed security agent technology according to the disclosed technology is depicted in FIG. 1. As shown, a network diagram 100 illustrates a number of networked computing devices (e.g., laptops 110 and 111, desktop computers 112 and 113, touch screen tablets 114 and 115, and file servers 116 and 117). The computing devices are running agents that communicate with one or more central computers (e.g., a monitor server 120 or a definition repository 125) via a network (e.g., a local area network (LAN) 130, the Internet network 135, a wide area network, and/or other suitable computing network). The computing devices and the central computer can have computer architectures as shown in FIG. 4 and discussed in further detail below. The computing devices are not limited to traditional personal computers but can comprise other computing hardware configured to connect to and communicate with a network (e.g., smart phones or other mobile computing devices, servers, network devices, dedicated devices, and the like).

In the illustrated embodiment, the computing devices are configured to communicate with one or more central computers (e.g., a monitor server 120 or a definition repository 125). In certain implementations, the central computers execute software for performing some or all of the disclosed compliance and configuration control functionalities. For example, the central computers can transmit data to any of the computing devices (e.g., definitions including criteria for evaluating the computing devices) as well as receive data from any of the computing devices (e.g., reports identifying differences in computing device state values and/or results of performing tests on objects associated with the computing devices). For example, the computing devices can receive definitions from the monitor server 120 and/or the definition repository 125, as well as send reports these central computers over the LAN 130 and/or Internet 135. In some examples, the definition repository 125 is controlled by a third party, such as a government, a corporation, or a standards-issuing body.

III. Example Identification of State Value Differences Using Definitions

Figure 2:
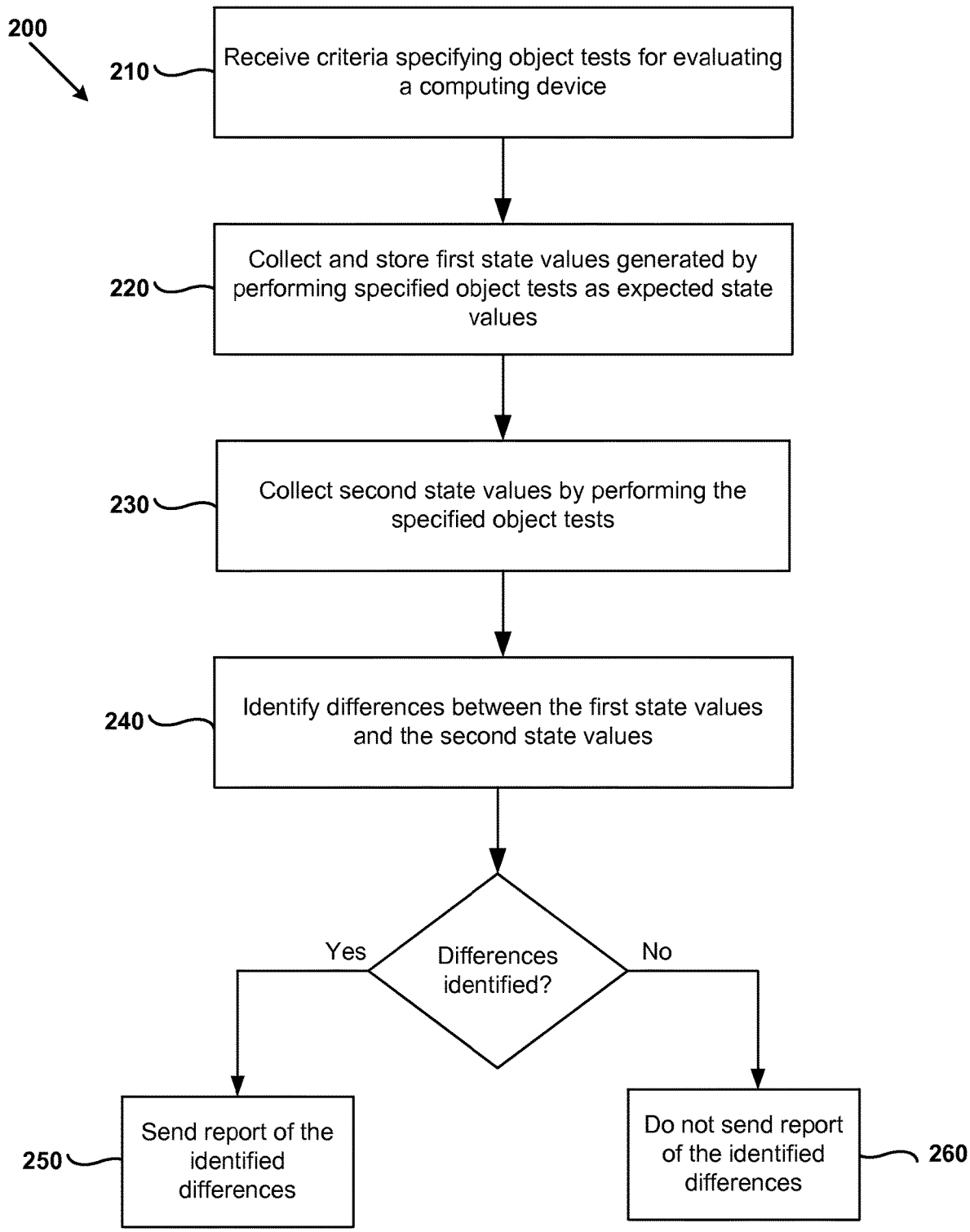
FIG. 2 is a flow chart detailing an example of a method of evaluating state value differences on computing devices, as can be used in certain embodiments of the disclosed technology.

FIG. 2 is a flow chart 200 detailing an example of method of evaluating state value differences on computing devices, as can be used in certain embodiments of the disclosed technology. The method of FIG. 2 can be performed using computing devices and central computers in a networked environment (e.g., as discussed above regarding FIG. 1).

At process block 210, one or more definitions are received describing criteria for evaluating a computing device. The definitions describe a security or compliance policy, and can include descriptions of objects tests and state values associated with those objects. Examples of objects that can be described include: registry entries, files, file systems attributes, processor or memory state, peripherals, or other suitable objects coupled to the computing devices. In some examples, the definitions include criteria for determining whether the tested object(s) are in compliance with a security policy, include certain inventory items, have had software patches installed, or exhibit vulnerabilities to known security threats. The criteria can include combinations of one or more tests that can be performed by the agent to determine states associated with the object. The test can include a description of the thing to be collected (an object) and an expected state that the object must match to pass the test. Thus, performing the tests determines the current state of the associated object and compares that current state to an expected state. For example, available tests to perform on a file can include evaluating file permissions (e.g., read, write, and delete, or group and user permissions), file sizes, or file contents (e.g., the existence, or absence, of strings or byte codes in the file). For example, valid state values for testing a file could include the file permissions being write only, the file size being 50 megabytes, or the presence of a bytecode associated with a computer virus. When evaluating the criteria, the result can be expressed as a boolean true/false value (pass/fail), or as finer-grained values (e.g., a range of integer values or strings expressing an evaluated vulnerability level determined using the criteria and associated object tests).

In some examples, the definitions are expressed in a vulnerability assessment language, for example, Open Vulnerability and Assessment Language (OVAL), which is distributed by MITRE Corporation. The use of such vulnerability assessment languages allows interoperability of unified standards across different organizations and computing environments. Organizations can develop, test, and deploy standardized policy definitions, which in turn can be adapted by particular organizations as part of a comprehensive security and vulnerability compliance program. After receiving the definitions, the method proceeds to process block 220.

At process block 220, the criteria received at process block 210 are evaluated and first state values are collected by performing object tests specified by the criteria. The first state values are stored for later comparison. For example, the first state values can be stored as expected state values for object tests in an OVAL-formatted file stored in a computer-readable storage medium, or stored in volatile memory accessible to an agent executing on a computing device. Storing state values allows for later comparison and further detailed analysis, above and beyond simply reporting whether an object passes or fails the defined criteria. After storing the first state values, the method proceeds to process block 230.

At process block 230, the same criteria that were evaluated at process block 220 are evaluated to collect second state values at a later point in time, by re-performing one or more of the object tests specified by the criteria. This collecting can be performed periodically (e.g., on an hourly or weekly basis), in response to receiving an event (e.g., receiving a request by a user of a computing device or a monitor server, or in response to detecting an event on the agent (e.g., the addition of new hardware or software). Second state values generated by performing tests defined using the criteria are stored, for example, in an OVAL-formatted file. Once second state values have been generated by reforming the object tests, the method proceeds to process block 240.

At process block 240, differences between the first state values stored at process block 220 and the second state values generated at process block 230 are identified. In some cases, the identifying can include comparing collected state values using a threshold for determining whether a difference exists. If one or more differences in the state values are identified, the method proceeds to process block 250 to send a report. Alternatively, if no differences are identified, the method proceeds to process block 260.

In some examples, each of the first state values and the second state values includes a single set of values generated by performing tests using criteria. In other examples, multiple sets of values can be stored as expected state values and then compared at process block 240. Thus, in some examples, if there are more than one set of values stored, then newly-collected state values matching any one of the set of values can be ignored and thus not identified as a difference.

At process block 250, a report is sent indicating differences identified at process block 240. For example, the differences can be reported to a user of the computing device that is executing the agent via a graphical user interface, or by sending an email containing an indication or description of the differences. Alternatively, a report describing the differences can be sent to a central computer (e.g., a monitor server), where further analysis of the reported differences can be performed. For example, a system administrator can use the generated reports to evaluate vulnerabilities, resource consumption, or other properties related to the objects associated with the reported differences.

In some examples, the report also includes a report describing whether the object is in compliance with the evaluated criteria. Thus, there can be cases where an object complies with the policy as specified in the criteria description, but the disclosed methods identify differences that can be reported for further analysis. Alternatively, an object may not comply with a policy, but no difference is determined by comparing the state values.

At process block 260, a report is not sent identifying differences. By not sending a report (such as described above regarding process block 250), an agent performing the method illustrated in FIG. 2 can avoid generating excessive data and consuming network resources when state differences in monitored objects have not been identified.

FIG. 3A is a portion 300 of OVAL-like code for a definition that can be used with some implementations of the disclosed methods. As shown, the definition includes identifying information, a description of the version and origin of the definition, and a classification of the definition (e.g., the definition can be classified as a vulnerability or compliance definition). As shown, the definition includes criteria 303 defined using Boolean operators to combine a number of file tests. The file tests include tests for the existence of the file, as well as a file test 305 for file permissions associated with the file /etc/password. As shown, the expected value 307 of the test is a Boolean 0 (or false), because the file is not expected to be writable by other users ("def:owrite"). A number of features of the code have been omitted or modified for clarity, but techniques for authoring such code will be readily discernible to one of ordinary skill in the relevant art.

FIG. 3B is a portion 310 of OVAL-like code for a modified test definition 315 that has been subsequently stored after the portion 300 was generated. As indicated by the updated portion 310, the/etc/password file was determined to have write permissions for other users (indicated by an expected value 317 of one). Thus, the new state of the computing device will be considered the "normal" (or expected) state of the computing device for future evaluations of the criteria using the modified test definition. In some examples, multiple states of the computing device can be collected and stored as expected states.

IV. Example Computing Environments for Implementing Embodiments of the Disclosed Technology FIG. 4 illustrates a generalized example of a suitable computing environment 400 in which described embodiments, techniques, and technologies, including reporting agents and monitor servers, can be implemented. For example, the computing environment 400 can implement evaluating criteria, performing tests, and sending reports of differences in state values, as described herein.

The computing environment 400 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 4, the computing environment 400 includes at least one central processing unit 410 and memory 420. In FIG. 4, this most basic configuration 430 is included within a dashed line. The central processing unit 410 executes computer-executable instructions and may be a real or a virtual processor. In a multi-processing system, multiple processing units execute computer-executable instructions to increase processing power and as such, multiple processors can be running simultaneously. The memory 420 may be volatile memory (e.g., registers, cache, RAM), non-volatile memory (e.g., ROM, EEPROM, flash memory, etc.), or some combination of the two. The memory 420 stores software 480, images, and video that can, for example, implement the technologies described herein. A computing environment may have additional features. For example, the computing environment 400 includes storage 440, one or more input devices 450, one or more output devices 460, and one or more communication connections 470. An interconnection mechanism (not shown) such as a bus, a controller, or a network, interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and that can be accessed within the computing environment 400. The storage 440 stores instructions for the software 480 and image data, which can implement technologies described herein.

The input device(s) 450 may be a touch input device, such as a keyboard, keypad, mouse, touch screen display, pen, or trackball, a voice input device, a scanning device, or another device, that provides input to the computing environment 400. For audio, the input device(s) 450 may be a sound card or similar device that accepts audio input in analog or digital form, or a CD-ROM reader that provides audio samples to the computing environment 400. The output device(s) 460 may be a display, printer, speaker, CD-writer, or another device that provides output from the computing environment 400.

The communication connection(s) 470 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 490. For example, agents can be executed in the computing environment 430 while producing definitions or receiving reports can be performed on servers located in the computing cloud 490.

Computer-readable media are any available media that can be accessed within a computing environment 400. By way of example, and not limitation, with the computing environment 400, computer-readable media include memory 420 and/or storage 440. As should be readily understood, the term computer-readable storage media includes the media for data storage such as memory 420 and storage 440, and not transmission media such as modulated data signals.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of embodiments shown in software can be implemented in hardware and vice versa.

In view of the many possible embodiments to which the principles of the disclosed invention may be applied, it should be recognized that the illustrated embodiments are only preferred examples of the invention and should not be taken as limiting the scope of the invention.

We claim:

1. A method of dynamic vulnerability detection using definitions specified at least in part in an Open Vulnerability and Assessment Language (OVAL), the method comprising:
   with an agent executing on a computing device:
   receiving, by the agent, a criterion for evaluating the computing device, the criterion being specified in an OVAL and comprising an object test for testing an object of the computing device for a vulnerability, wherein the object test describes a state of the object of the computing device to be tested;
   by the agent, conducting a first evaluation of the criterion specified in the OVAL, comprising performing the object test of the criterion on the computing device, and retrieving a first state value of the object tested by the object test;

determining, by the agent, based on a result of the first evaluation of the criterion, that the computing device satisfies the criterion;

storing the first state value as an expected state value for the object, wherein the first state value is stored on the computing device separate from the object test;

after storing the first state value, by the agent, conducting a second evaluation of the criterion, comprising performing the object test of the criterion on the computing device and retrieving a second state value of the object tested by the object test;

determining, by the agent, based on a result of the second evaluation of the criterion, that the computing device satisfies the criterion;

identifying, by the agent, one or more differences between the stored expected state value and the second state value; and transmitting the identified one or more differences, along with a flag indicating that the identified one or more differences represent a potential vulnerability in the computing device, from the computing device to a monitor server.

2. The method of claim 1, further comprising sending a report to the monitor server indicating whether the computing device satisfies the object test.

3. The method of claim 1, wherein the storing comprises storing the expected value in an OVAL-formatted file.

4. The method of claim 1, wherein the identifying comprises comparing the second state value to the stored expected state value for the object test.

5. The method of claim 1, wherein:
the object test is a first object test; and
the storing the first state value comprises storing a second object test specifying the first state value as an expected value for the second object tests.

6. The method of claim 1, wherein:
the criterion is a first criterion; and
the storing the first state values comprises storing a second criterion different than the first criterion, the second criterion being based at least in part on the first criterion.

7. The method of claim 1, wherein the object test is one of the following: file integrity monitoring, monitoring system characteristics, a compliance test, an inventory test, a patch test, or a vulnerability test.

8. The method of claim 1, wherein the storing comprises saving the first state value on the computing device.

9. The method of claim 1, wherein the criterion is specified at least in part using an Extensible Configuration Checklist Description Format (XCCDF) and/or an OVAL specification format.

10. The method of claim 1, wherein the stored expected state value is specified as an object test using an Extensible Configuration Checklist Description Format (XCCDF) and/or an OVAL specification format.

11. The method of claim 2, wherein the report is stored in an ETL data warehouse or data mart.

12. A computing device, comprising:
one or more processors; and
one or more computer-readable storage media storing computer-executable instructions that, when executed by the one or more processors, cause the computing device to perform operations, the operations comprising:
receiving a criterion for evaluating the computing device, the criterion being specified in an Open Vulnerability and Assessment Language (OVAL) and comprising an object test for testing an object of the computing device for a vulnerability, wherein the object test describes a state of the object of the computing device to be tested;

conducting a first evaluation of the criterion specified in the OVAL, comprising performing the object test of the criterion on the computing device and retrieving a first state value of the object tested by the object test;

determining that the computing device satisfies the object test;

storing the first state value on the computing device separate from the object test;

after storing the first state value, conducting a second evaluation of the criterion, comprising performing the object test of the criterion on the computing device and retrieving a second state value of the object tested by the object test;

determining that the computing device still satisfies the criterion, but that there are one or more differences between the stored first state value and the second state value of the object; and transmitting the differences between the stored first state value and the second state value of the object, along with a flag indicating that the differences represent a potential vulnerability in the computing device, from the computing device to a monitor server.

13. The computing device of claim 12, wherein the operations further comprise:
sending a report to the monitor server indicating whether the computing device satisfies the object test.

14. The computing device of claim 12, wherein the storing comprises storing the expected value in an OVAL-formatted file.

15. The computing device of claim 12, wherein the identifying comprises comparing the second state value to the stored first state value for the object test.

16. The computing device of claim 12, wherein:
the criterion is a first criterion; and
the storing the first state value comprises storing a second criterion, different than the first criterion.

17. The computing device of claim 12, wherein the storing comprises saving the first state value on the one or more computer-readable storage media of the computing device.

18. The computing device of claim 12, wherein the criterion is specified at least in part using an Extensible Configuration Checklist Description Format (XCCDF) and/or an OVAL specification format.

19. The computing device of claim 12, wherein the stored expected state value is specified as an object test using an Extensible Configuration Checklist Description Format (XCCDF) and/or an OVAL specification format.

20. The computing device of claim 12, wherein the operations further comprise:
evaluating one or more security criteria based, at least in part, on a result of the object test, each of the one or more security criteria indicating a level of compliance or vulnerability of the computing device according to a security policy.

21. The computing device of claim 12, wherein conducting the first evaluation of the criterion comprises analyzing the integrity of one or more files stored on one or more computer-readable storage media of the computing device.

22. A system comprising a computing server comprising one or more hardware processors, one or more network interfaces, and one or more computer-readable storage media storing computer-executable instructions that, when executed by the one or more hardware processors, cause the computing server to perform operations, the operations comprising:

receiving, via the one or more network interfaces, a criterion for evaluating the computing server, the criterion being specified in an Open Vulnerability and Assessment Language (OVAL) and comprising an object test for testing an object of the computing server for a vulnerability, wherein the object test describes a state of the object of a computing device to be tested;

conducting, using the one or more hardware processors, a first evaluation of the criterion specified in the OVAL and generating first state values by performing the object test of the criterion on the computing server, and retrieving a first state value of the object tested by the object test;

determining, using the one or more hardware processors, based on a result of the first evaluation of the criterion, that the computing device satisfies the object test;

storing, using the one or more hardware processors, the first state value as an expected state value for the object, wherein the first state value is stored on the computing device separate from the object test;

after storing the first state value, conducting, using the one or more hardware processors, a second evaluation of the criterion by performing the object test of the criterion on the computing server, and retrieving a second state value of the object tested by the object test;

determining, using the one or more hardware processors, based on a result of the second evaluation of the criterion, that the computing device satisfies the object test;

identifying, using the one or more hardware processors, one or more differences between the stored first state value and the second state value of the object; and transmitting, via the one or more network interfaces, the identified one or more differences, along with a flag indicating that the identified one or more differences represent a potential vulnerability in the computing server, from the computing server to a monitor server.

23. The system of claim 22, wherein the operations further comprise:

transmitting, via the one or more network interfaces, a report to the monitor server indicating whether the computing server satisfies the object test.

24. The system of claim 22, wherein the storing the first state values as the expected state value for the object comprises storing the expected state value in an OVAL-formatted file.

25. The system of claim 22, wherein the criterion comprises a security policy and the identified one or more differences indicate a change to the security policy.

26. The system of claim 22, further comprising the monitor server, wherein the monitor server is configured to transmit the criterion to the computing server.

* * * * *